US008869956B2

(12) United States Patent
Wen

(10) Patent No.: US 8,869,956 B2
(45) Date of Patent: Oct. 28, 2014

(54) BRAKE PAD STRUCTURE OF HYDRAULIC BRAKE

(71) Applicant: Yuan-Hung Wen, Hemei Town (TW)

(72) Inventor: Yuan-Hung Wen, Hemei Town (TW)

( * ) Notice: Subject to any disclaimer, the term of this patent is extended or adjusted under 35 U.S.C. 154(b) by 69 days.

(21) Appl. No.: 13/705,044

(22) Filed: Dec. 4, 2012

(65) Prior Publication Data

US 2014/0151168 A1     Jun. 5, 2014

(51) Int. Cl.
*F16D 65/10*     (2006.01)
*F16D 65/092*     (2006.01)
*F16D 65/847*     (2006.01)

(52) U.S. Cl.
CPC ............ *F16D 65/092* (2013.01); *F16D 65/847* (2013.01)
USPC ................................. 188/264 R; 188/264 A

(58) Field of Classification Search
USPC ............. 188/218 XL, 264 A, 264 AA, 264 R
See application file for complete search history.

(56) References Cited

U.S. PATENT DOCUMENTS

| 3,277,985 | A | * | 10/1966 | Caskey | ................. | 188/264 AA |
| 3,592,297 | A | * | 7/1971 | Leffert | ......................... | 188/71.6 |
| 7,905,335 | B2 | * | 3/2011 | Demers | .................... | 188/264 R |
| 8,413,771 | B2 | * | 4/2013 | Teagan | ..................... | 188/264 R |
| 8,550,220 | B2 | * | 10/2013 | Iwai et al. | ................ | 188/264 A |

* cited by examiner

*Primary Examiner* — Christopher Schwartz

(57) ABSTRACT

A brake pad structure of a hydraulic brake includes a back plate, a friction member and a heat dissipation device. The back plate has a first heat transfer coefficient. The heat dissipation device includes a connecting portion and a heat dissipation portion. The connecting portion is disposed between the back plate and the friction member. The heat dissipation portion is protrusive outside the back plate and the friction member. The heat dissipation device has a second heat transfer coefficient greater than the first heat transfer coefficient. Whereby, heat of the friction member can be transferred to the air via the heat dissipation device, and thus the friction member will not be superheated and less heat can be transferred to the hydraulic fluid inside an oil pressure cylinder, such that failure of brake can be prevented.

11 Claims, 8 Drawing Sheets though it's not limited. Accordingly, an operator can operate the wedge portion 312 to be engaged with the fixation portion 211, and then the connecting portion 31 can be fixed to the first surface 21 of the back plate 20.

BRAKE PAD STRUCTURE OF HYDRAULIC BRAKE

BACKGROUND OF THE INVENTION

1. Field of the Invention

The present invention relates to a brake pad structure of a hydraulic brake.

2. Description of the Prior Art

Generally, a friction member of a hydraulic brake structure is for braking a brake disc during a brake and the temperature thereof is rising. A higher temperature of the friction member can affect the hydraulic fluid inside the hydraulic brake structure. The higher the temperature of the friction member is, the worse the brake effect is. As such, failure of brake can somehow occur.

In some conventional hydraulic brake structures, such as one disclosed in TWM436108 or U.S. Pat. No. 7,905,335, a heat dissipation device is mounted to a back plate. In some conventional hydraulic brake structures, such as one disclosed in TW201229401, a heat dissipation device is mounted to an elastic member to rapidly dissipate the heat from the friction member so as to prevent failure of brake. However, the heat from either of the friction members in the above conventional hydraulic brake structures should be indirectly transferred to the heat dissipation device via the back plate, so that the heat dissipation efficiency is worse.

In a conventional hydraulic brake structure as disclosed in TW201210884, a cooling plate is disposed between the friction member and the back plate. However, since the cooling plate contacts the back plate directly, the heat from the cooling plate can be rapidly transferred to the back plate. As such, the heat will then be rapidly transferred to the hydraulic fluid inside the oil pressure cylinder, which results in deterioration of the hydraulic fluid and failure of brake. In addition, a base is disposed between the friction member and the cooling plate, in which the base is mounted with a rivet which contacts the piston of the oil pressure cylinder. As such, the heat from the friction member will be transferred to the oil pressure cylinder more rapidly to cause deterioration of the hydraulic fluid inside the oil pressure cylinder. Furthermore, the friction member is wholly fixed to the base, the heat from the friction member has to be transferred through the base and then to the cooling plate, and thus the heat dissipation efficiency is worse.

In another conventional hydraulic brake structure as disclosed in TWM343085, a back plate is made of materials whose heat transfer coefficients are different so as to provide better heat dissipation effect. However, the heat is dissipated via the friction member, that is, much heat is transferred to the oil pressure cylinder, and the hydraulic fluid inside the oil pressure cylinder is much possible to be superheated and deteriorated.

The present invention is, therefore, arisen to obviate or at least mitigate the above mentioned disadvantages.

SUMMARY OF THE INVENTION

An object of the present invention is to provide a brake pad structure of a hydraulic brake which can rapidly and sufficiently dissipate heat and prevent failure of brake.

To achieve the above and other objects, a brake pad structure of a hydraulic brake includes a back plate, a friction member, and a heat dissipation device. The back plate has a first heat transfer coefficient, the back plate includes a first surface and a second surface, and the second surface is to be urged by an oil pressure cylinder. The friction member is for braking a brake disc. The heat dissipation device includes a connecting portion and a heat dissipation portion. The connecting portion is disposed between the back plate and the friction member. The heat dissipation portion is protrusive outside the back plate and the friction member, and the heat dissipation device has a second heat transfer coefficient greater than the first heat transfer coefficient.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
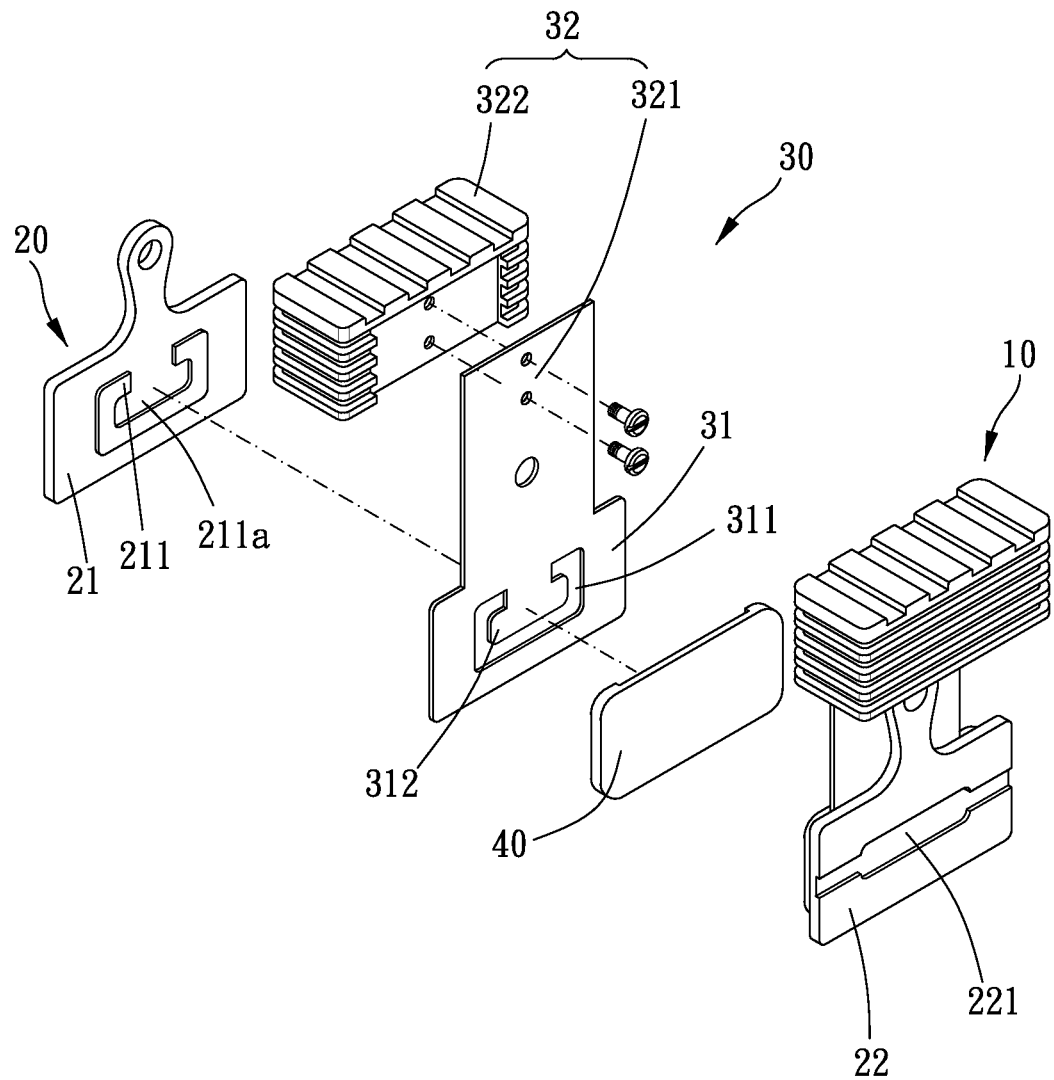
FIG. 1 is a perspective breakdown drawing according to a first preferred embodiment of the present invention.

As shown in FIG. 1, a brake pad structure 10 of a hydraulic brake according to a first preferred embodiment of the present invention includes a back plate 20, a friction member 40 and a heat dissipation device 30.

The back plate 20 includes a first surface 21 and a second surface 22. The first surface 21 of the back plate 20 is formed with a protrusive fixation portion 211, and the second surface 22 of the back plate 20 is formed with at least one heat dissipation groove 221. Preferably, the heat dissipation groove 221 extends laterally on the second surface 22 and has two openings opened at two opposing sides of the back plate 20. The back plate 20 has a first heat transfer coefficient. The back plate 20 may be, but not limited to, a sufficiently hard metal material.

The friction member 40 is for braking a brake disc.

The heat dissipation device 30 includes a connecting portion 31 and a heat dissipation portion 32. The connecting portion 31 of the heat dissipation device 30 is fixed between the back plate 20 and the friction member 40, and the heat dissipation portion 32 is protrusive outside the back plate 20 and the friction member 40. More specifically, the fixation portion 211 is formed with a recess 211a. The fixation portion 211 is substantially C-shaped, and the recess 211a has an opening toward the heat dissipation portion 32 (toward a top of the back plate 20). The connecting portion 31 is formed with a hole 311 and includes a wedge portion 312, and the hole 311 is formed around the wedge portion 312. The hole 311 and the fixation portion 211 have corresponding shapes, and the wedge portion 312 and the recess 211a have corresponding shapes. The wedge portion 312 is wedged in the recess 211a and the fixation portion 211 is received in the hole 311, so that the connecting portion 31 is fixedly attached to fixation portion 211. The heat dissipation portion 32 includes a heat dissipation plate 321 and a heat sink 322. The heat dissipation plate 321 is connected to the connecting portion 31 and outside the back plate 20 and the friction member 40. The heat dissipation plate 321 and the connecting portion 31 may be integrally formed or detachably assembled. The heat dissipation plate 321 and the connecting portion 31 may be made of Cu or Cu-containing alloy, preferably of bronze. The brake pad structure 10 further includes a pin 50 disposed through the back plate 20 and the heat dissipation device 30 (as shown in FIG. 2), so that the connecting portion 31 is fixed to the first surface 21 of the back plate 20.

Figure 6:
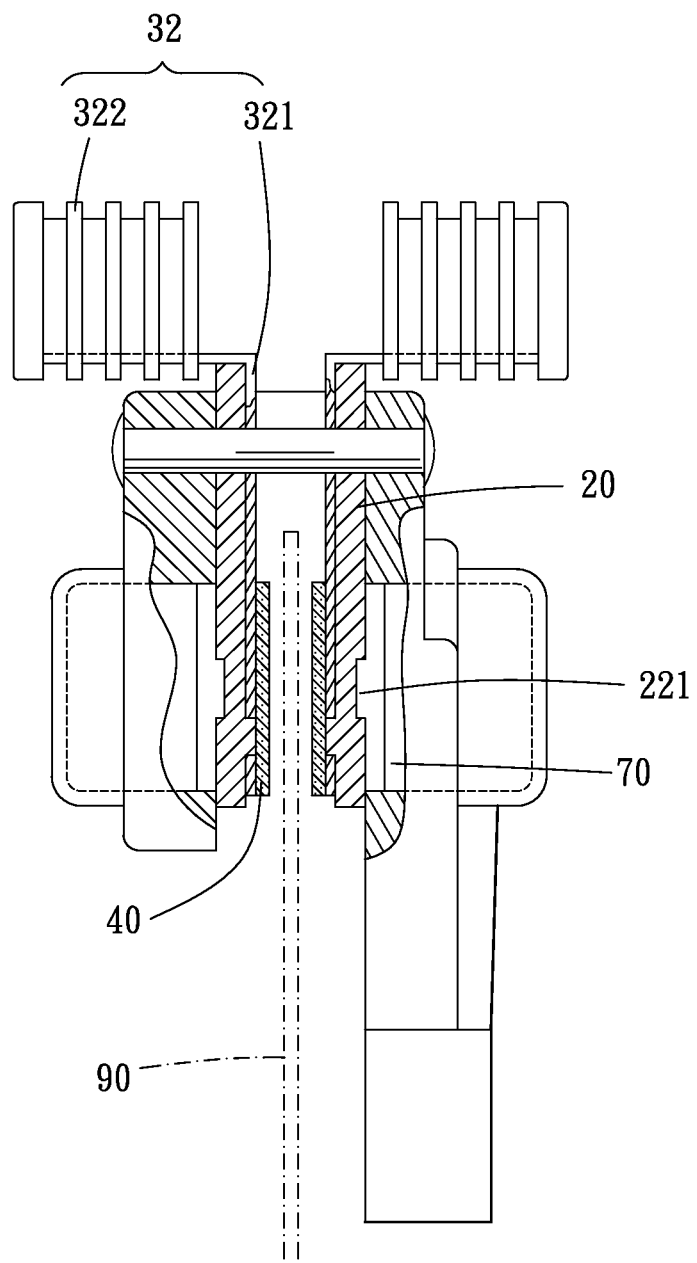
FIG. 6 is a side view according to a second preferred embodiment of the present invention.

In a second preferred embodiment, the heat dissipation plate 321 is sheet-shaped and bendable, and is able to be bent manually or by using a tool to form at least one bending portion (as shown in FIG. 6). It is noted that the bending portion may have any suitable shape. The heat sink 322 is attached to the heat dissipation plate 321. The heat sink 322 has a plurality of fins, and every two adjacent fins form a gap therebetween. The heat dissipation device 30 has a second heat transfer coefficient greater than first heat transfer coefficient. The connecting portion 31, the heat dissipation plate 321 and the heat sink 322 may be made of the same material; at least two of them may be made of different materials; or all of them may be made of different materials. The second heat transfer coefficient in this embodiment is an equivalent heat transfer coefficient of the connecting portion 31, the heat dissipation plate 321 and heat sink 322.

Figure 2:
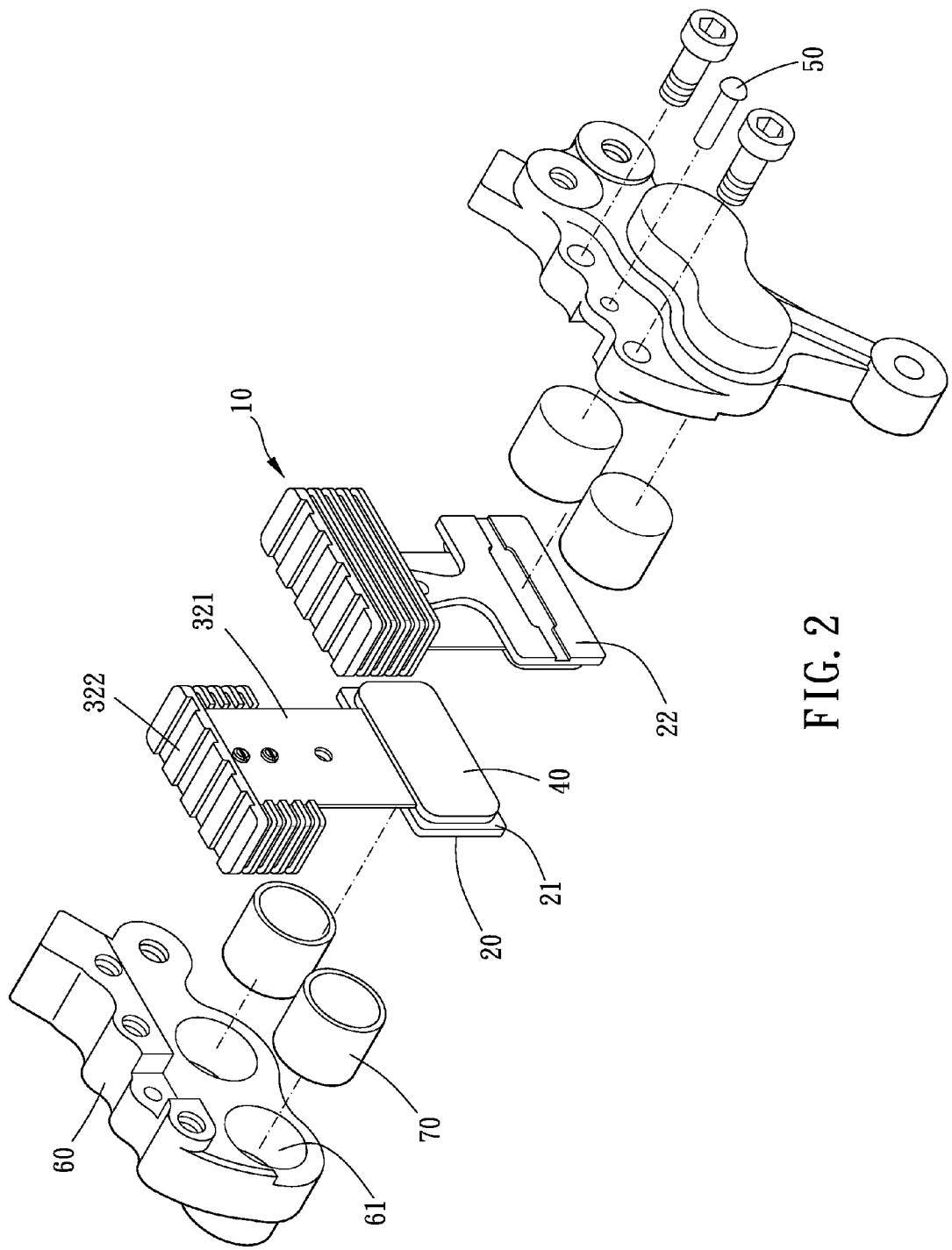
FIG. 2 is a perspective breakdown drawing showing a brake pad structure assembled with a disc brake device according to the first preferred embodiment of the present invention.
Figure 3:
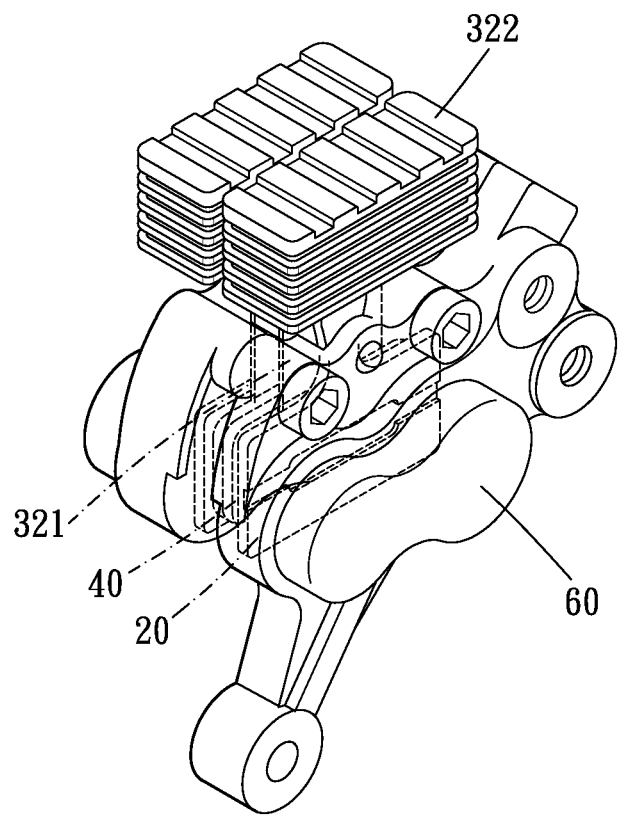
FIG. 3 is a perspective view showing the brake pad structure assembled with the disc brake device according to the first preferred embodiment of the present invention.

As shown in FIGS. 2 and 3, the brake pad structure 10 is mounted to a hydraulic brake, and the hydraulic brake includes two main bodies 60, four pistons 70 and the pin 50. Each main body 60 is formed with two oil pressure cylinders 61. The pistons 70 are slidably received in the respective oil pressure cylinders 61. The two back plates 20 are disposed between the pistons 70. The pin 50 is disposed through the two main bodies 60, the two heat dissipation plates 321 and the two back plates 20.

Figure 4:
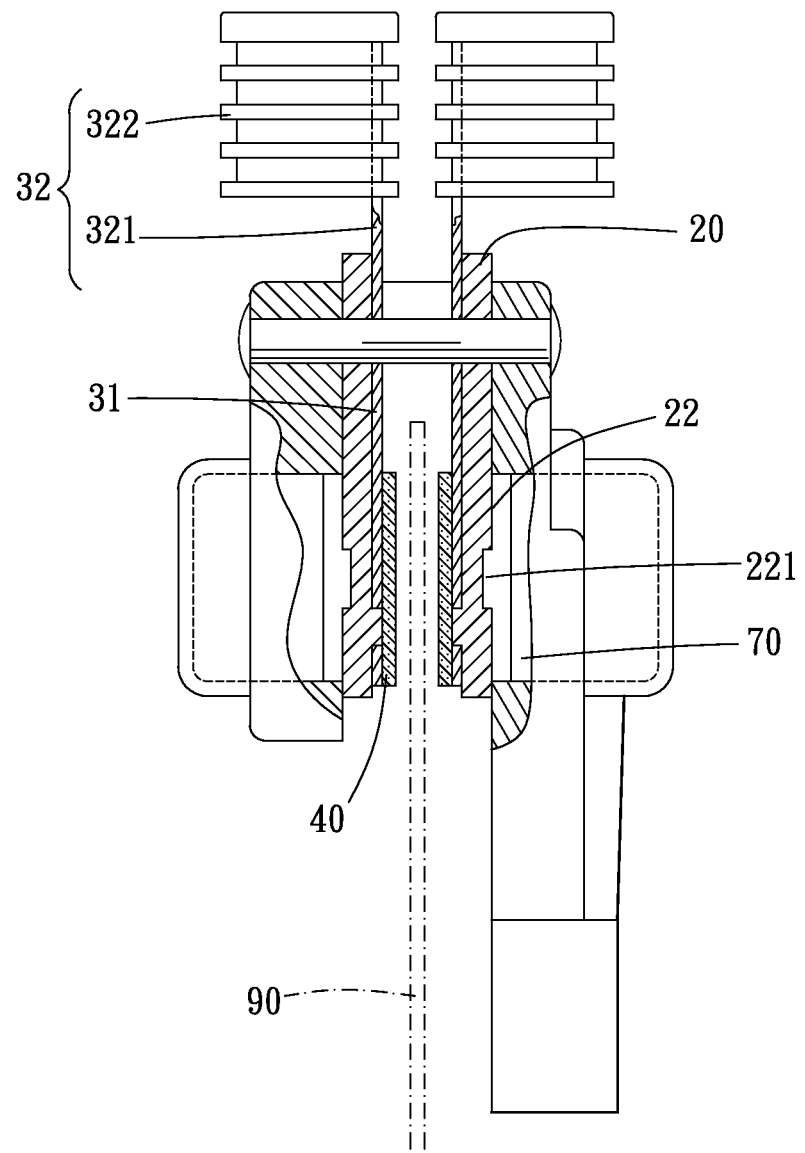
FIG. 4 is a side view according to the first preferred embodiment of the present invention.
Figure 5:
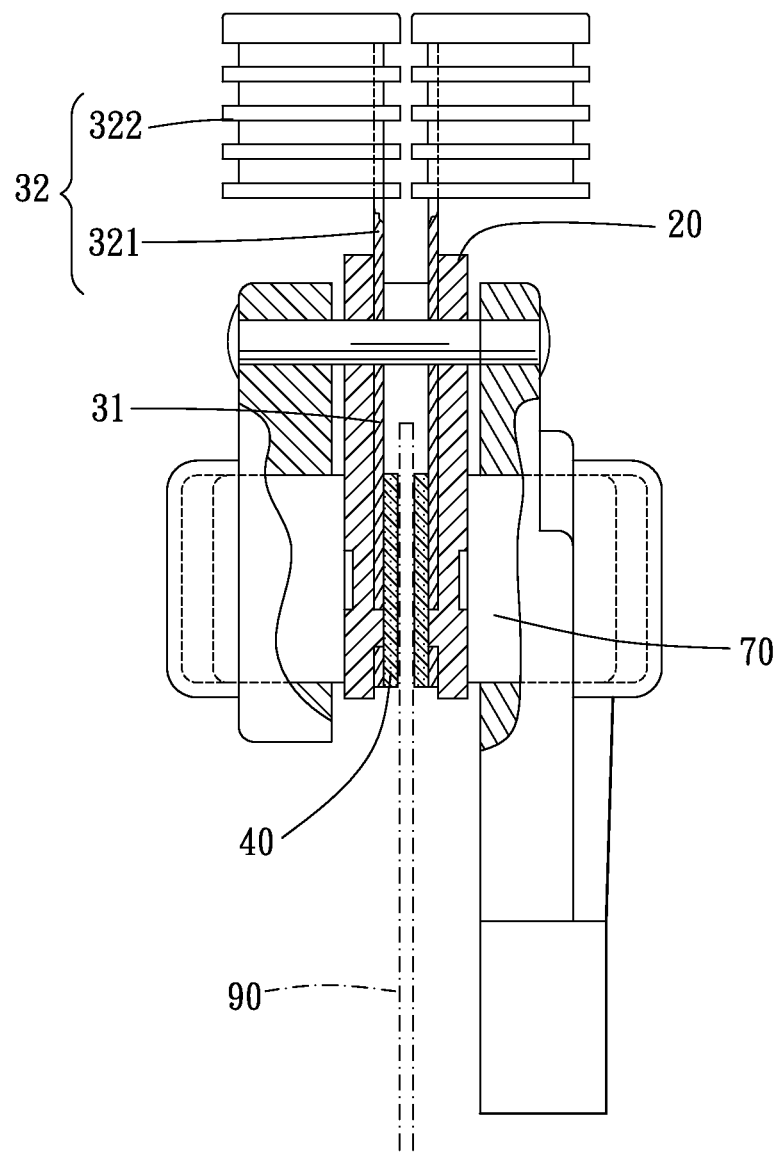
FIG. 5 is a side view showing the brake pad structure braking a brake disc according to the first preferred embodiment of the present invention.

As shown in FIGS. 4 and 5, when braking, the two friction members 40 are moved to clamp a brake disc 90 (as shown in FIG. 5) to make a brake, and the temperature of the friction member 40 is rising accordingly. As a result, the heat from the friction member 40 can be transferred directly to the connecting portion 31, the heat is then transferred to the heat dissipation portion 32, and the heat dissipation plate 321 and the heat sink 322 of the heat dissipation portion 32 can dissipate the heat outside into the air. Since the heat sink 322 has a large area of surface for heat dissipation, the heat dissipation effect is excellent and failure of brake due to that the friction member 40 is superheated can be prevented.

Since the second heat transfer coefficient is greater than first heat transfer coefficient, the heat from the friction member 40 can be rapidly transferred to the heat dissipation device 30 to be dissipated into the air rapidly and less heat can be transferred to the back plate 20. Hence, less heat can be transferred via the back plate 20 to the oil pressure cylinders 61 so as to prevent failure of brake due to deterioration of the hydraulic fluid inside the oil pressure cylinders 61, caused by superheating of the hydraulic fluid.

Furthermore, the heat dissipation groove 221 permits the air to flow through so as to further facilitate the heat dissipation efficiencies of the back plate 20 and the friction member 40. Besides, the heat from the pistons 70 can also be dissipated into the air via the heat dissipation groove 221, which can help to prevent failure of brake due to deterioration of the hydraulic fluid inside the oil pressure cylinders 61, caused by superheating of the hydraulic fluid.

Additionally, the heat dissipation plate 321 and the connecting portion 31 may be integrally formed and thus has a small size, so that the brake pad structure 10 has a small thickness and is suitable for mounting for the main bodies 60.

Since the heat dissipation plate 321 may be able to be bent manually and the heat dissipation portion 32 extends outside the main body 60 as it is mounted to the main body 60, an user can selectively bend the heat dissipation plate 321 to locate it in a suitable position, which provides a free arrangement of the heat dissipation device 30 according to a limited narrow space, as shown in FIG. 6.

Figure 7:
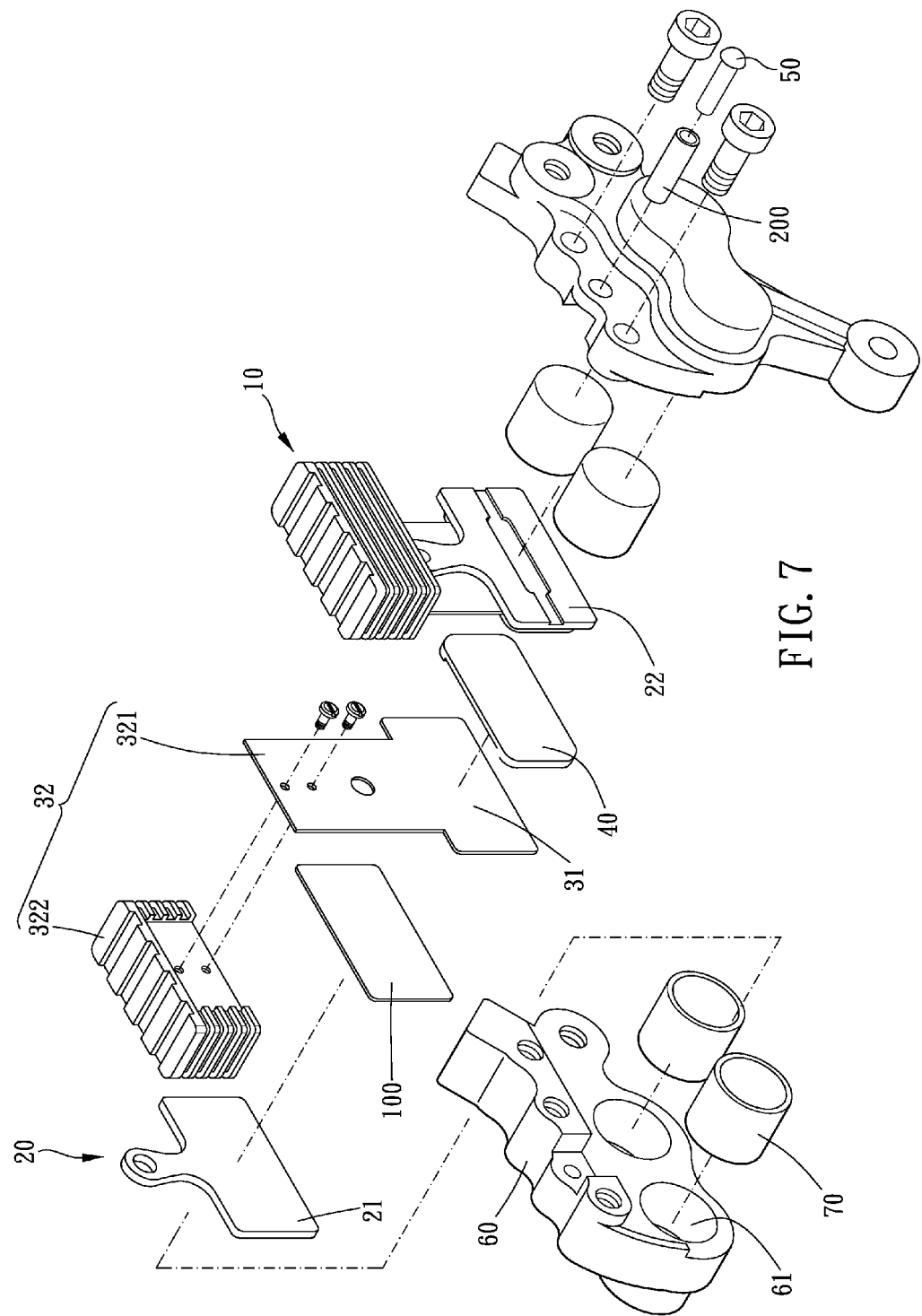
FIG. 7 is a perspective breakdown drawing according to a third preferred embodiment of the present invention.
Figure 8:
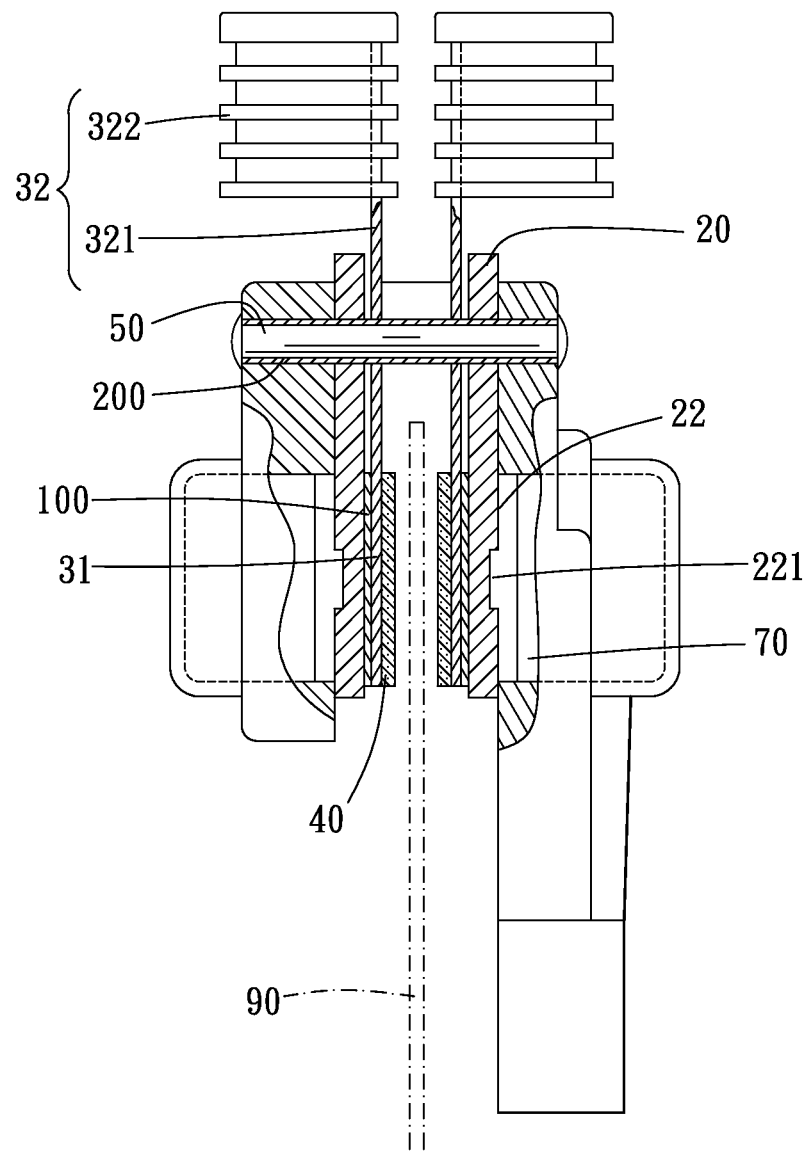
FIG. 8 is a side view according to the third preferred embodiment of the present invention.

As shown in FIGS. 7 and 8, in a third preferred embodiment, the brake pad structure 10 further includes a heat isolation layer 100 which is disposed between the first surface 21 of the back plate 20 and the connecting portion 31. The heat isolation layer 100 has a third heat transfer coefficient smaller than the first heat transfer coefficient and the second heat transfer coefficient. Since the heat isolation layer 100 is disposed between the back plate 20 and the connecting portion 31 of the heat dissipation device 30, the heat isolation layer 100 can isolate the heat so that the heat cannot be transferred from the heat dissipation device 30 to the back plate 20. As such, failure of brake due to deterioration of the hydraulic fluid inside the oil pressure cylinders 61 can be prevented. Preferably, the brake pad structure 10 may further include a heat isolation bush 200 disposed through the back plates 20 and the heat dissipation plates 321 of the heat dissipation devices 30. The heat isolation bush 200 may be extends through entire thicknesses of the back plates 20 and the heat dissipation plates 321. The pin 50 is inserted in the heat isolation bush 200 and preferably does not contact the back plate 20. For example, the heat isolation bush 200 may further includes two extensions extending from two respective ends thereof, wherein the two extensions are preferably located between two end heads of the pin 50 so that the pin 50 wholly does not contact the back plates 20. The heat isolation bush 200 has a fourth heat transfer coefficient smaller than the first heat transfer coefficient and the second heat transfer coefficient, and preferably a member which can completely isolate heat. As such, the heat from the heat dissipation device 30 is blocked or isolated by the heat isolation bush 200 and cannot be transferred to the back plates 20 via the pin 50, and the heat will not be transferred to the oil pressure cylinders 61 to superheat the hydraulic fluid.

Given the above, the brake pad structure of the present invention can rapidly and sufficiently dissipate heat and unpermits the heat to transfer to the oil pressure cylinders 60, which prevents failure of brake.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A brake pad structure of a hydraulic brake, including:
    a back plate, having a first heat transfer coefficient, the back plate including a first surface and a second surface, the second surface to be urged by an oil pressure cylinder;
    a friction member, for braking a brake disc; and
    a heat dissipation device, including a connecting portion and a heat dissipation portion, the connecting portion disposed between the back plate and the friction member, the heat dissipation portion being protrusive outside the back plate and the friction member, the heat dissipation device having a second heat transfer coefficient greater than the first heat transfer coefficient;

wherein the connecting portion at least contacts the friction member.

2. The brake pad structure of hydraulic brake of claim 1, wherein the heat dissipation portion includes a heat dissipation plate connected to the connecting portion and outside the back plate and the friction member.

3. The brake pad structure of a hydraulic brake of claim 2, wherein the heat dissipation plate and the connecting portion are made of Cu or Cu-containing alloy.

4. The brake pad structure of a hydraulic brake of claim 2, wherein the heat dissipation portion includes a heat sink attached to the heat dissipation plate.

5. The brake pad structure of a hydraulic brake of claim 2, wherein the heat dissipation plate is sheet-shaped and bendable, and the heat dissipation plate is able to be bent to form at least one bending portion.

6. The brake pad structure of a hydraulic brake of claim 2, wherein the heat dissipation plate and the connecting portion are integrally formed in one piece.

7. The brake pad structure of a hydraulic brake of claim 1, wherein the first surface of the back plate is formed with a protrusive fixation portion, and the connecting portion is fixed to the fixation portion.

8. The brake pad structure of a hydraulic brake of claim 7, wherein the fixation portion is formed with a recess, the connecting portion is formed with a hole and a wedge portion, the hole is formed around the wedge portion, the hole and the fixation portion have corresponding shapes, and the wedge portion and the recess have corresponding shapes.

9. The brake pad structure of a hydraulic brake of claim 1, wherein the second surface of the back plate is formed with at least one heat dissipation groove.

10. The brake pad structure of a hydraulic brake of claim 1, further including a heat isolation bush and a pin, the heat isolation bush is disposed through the back plate and the heat dissipation device, the pin is inserted in the heat isolation bush, and the heat isolation bush has a fourth heat transfer coefficient smaller than the first heat transfer coefficient and the second heat transfer coefficient.

11. The brake pad structure of a hydraulic brake of claim 1, further including a heat isolation layer disposed between the first surface of the back plate and the connecting portion, and the heat isolation layer has a third heat transfer coefficient smaller than the first heat transfer coefficient and the second heat transfer coefficient.

* * * * *